(12) United States Patent
Nakamura

(10) Patent No.: US 9,342,769 B2
(45) Date of Patent: May 17, 2016

(54) IMAGE PROCESSING APPARATUS AND IMAGE PROCESSING METHOD FOR CORRECTING A LINE IMAGE

(71) Applicant: CANON KABUSHIKI KAISHA, Tokyo (JP)

(72) Inventor: Yasuyuki Nakamura, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/741,899

(22) Filed: Jun. 17, 2015

(65) Prior Publication Data

US 2015/0371122 A1 Dec. 24, 2015

(30) Foreign Application Priority Data

Jun. 18, 2014 (JP) ................................ 2014-125734

(51) Int. Cl.
*G06K 15/02* (2006.01)
*H04N 1/40* (2006.01)
*H04N 1/409* (2006.01)

(52) U.S. Cl.
CPC ........ *G06K 15/1873* (2013.01); *G06K 15/1822* (2013.01); *H04N 1/409* (2013.01); *H04N 1/40068* (2013.01)

(58) Field of Classification Search
None
See application file for complete search history.

(56) References Cited

U.S. PATENT DOCUMENTS

| 5,325,474 A * | 6/1994 | Kumazaki | G06K 15/1209 345/611 |
| 5,742,317 A * | 4/1998 | Kashihara | G06K 15/00 347/131 |
| 6,473,201 B1 * | 10/2002 | Sato | H04N 1/40068 358/1.9 |
| 2008/0278762 A1 * | 11/2008 | Seo | G03G 15/0115 358/3.06 |
| 2015/0062657 A1 * | 3/2015 | Okubo | G06K 15/188 358/3.01 |

FOREIGN PATENT DOCUMENTS

JP 2007-300206 A 11/2007

* cited by examiner

*Primary Examiner* — Scott A Rogers
(74) *Attorney, Agent, or Firm* — Canon USA, Inc. IP Division

(57) ABSTRACT

An image processing apparatus increases, in the case of a low-density line, the density of a pixel included in the line to increase the density of the line, and increases, in the case of a high-density line, the density of a pixel adjacent to the pixel included in the line to increase the width of the line.

18 Claims, 9 Drawing Sheets

FIG. 5

| INPUT DENSITY | OUTPUT DENSITY |
|---|---|
| 0 → | 0 |
| ⋮ | ⋮ |
| 10 → | 25 |
| ⋮ | ⋮ |
| 30 → | 60 |
| ⋮ | ⋮ |
| 80 → | 80 |
| ⋮ | ⋮ |
| 100 → | 100 |

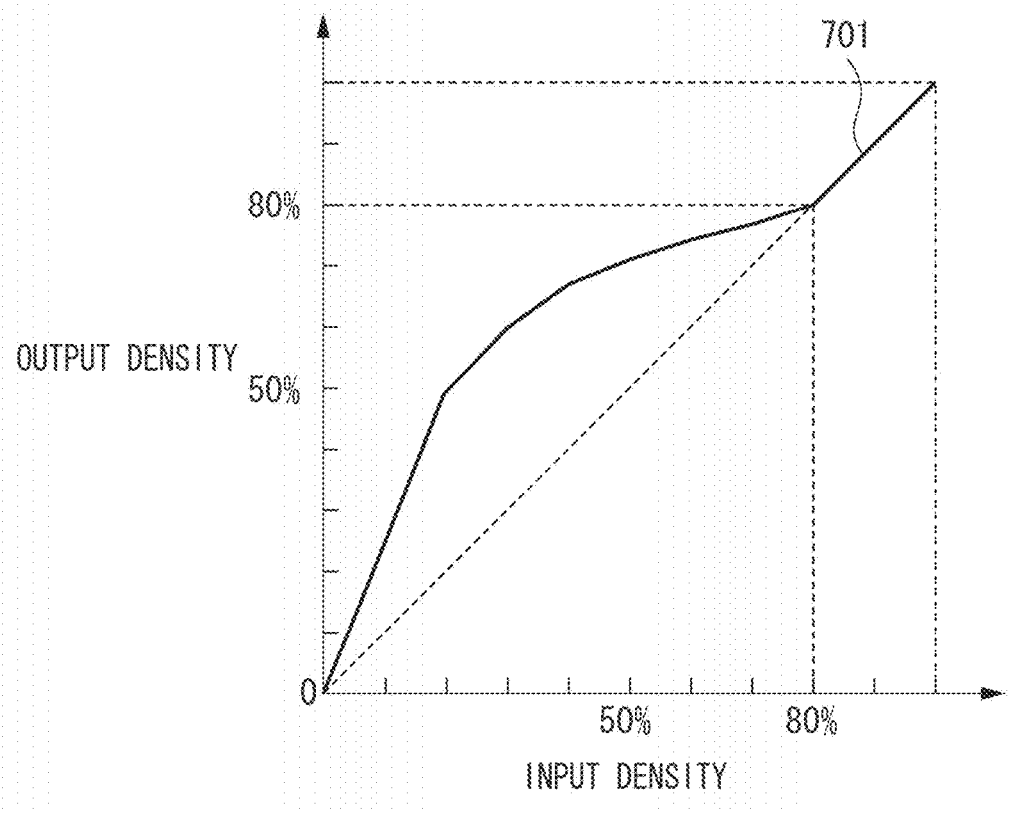

ONE-PIXEL WIDTH THIN LINE
(DENSITY 30%)

ONE-PIXEL WIDTH THIN LINE
(AFTER DITHER PROCESSING)

ONE-PIXEL WIDTH THIN LINE
(DENSITY 60%)

ONE-PIXEL WIDTH THIN LINE
(AFTER DITHER PROCESSING)

ONE-PIXEL WIDTH THIN LINE
(DENSITY 80%)

ONE-PIXEL WIDTH THIN LINE
(AFTER DITHER PROCESSING)

TWO-PIXEL WIDTH THIN LINE
(DENSITY 80%)

TWO-PIXEL WIDTH THIN LINE
(AFTER DITHER PROCESSING)

ONE-PIXEL WIDTH THIN LINE
(DENSITY 100%)

ONE-PIXEL WIDTH THIN LINE
(AFTER DITHER PROCESSING)

IMAGE PROCESSING APPARATUS AND IMAGE PROCESSING METHOD FOR CORRECTING A LINE IMAGE

BACKGROUND OF THE INVENTION

1. Field of the Invention

The present invention relates to an image processing technique for improving line visibility.

2. Description of the Related Art

An image forming engine (also referred to as a printing engine) in an image forming apparatus fixes a coloring agent to a sheet such as paper, to print an image on the paper. The printing engine makes an amount of the coloring agent per pixel variable, to represent gradation of the image. A user may desire to improve line visibility in such a manner that a line to be printed looks thick and wide in the image forming apparatus.

Japanese Patent Application Laid-Open No. 2007-300206 discusses processing for increasing the density of pixels composing a line included in image data to thicken the line to be printed. Through this processing, in the image forming apparatus, an amount of a coloring agent per pixel increases. Generally, when the amount of the coloring agent per pixel increases, the area of the coloring agent per pixel also increases. Thus, the density and the width of the line per unit area also increase. For a user, the line seems to have become thicker and wider. That is, line visibility is improved.

However, in some cases, only by the processing discussed in Japanese Patent Application Laid-Open No. 2007-300206, line visibility may not be improved. For example, the density of the pixels constituting the line may be sufficiently high (close to the maximum density). In this case, the density of the pixels cannot be increased beyond the maximum density when increasing the density of the line. Therefore, line visibility has been difficult to improve through the processing for increasing the density of the line having a sufficiently high density.

SUMMARY OF THE INVENTION

According to an aspect of the present invention, an image processing apparatus includes a generation unit configured to generate image data, a first determination unit configured to determine whether a target pixel included in the image data belongs to a line, a second determination unit configured to determine whether a density of the target pixel included in the image data is less than a predetermined density, and a correction unit configured to perform correction to increase the density of the target pixel when the first determination unit determines that the target pixel belongs to the line and the second determination unit determines that the density of the target pixel is less than the predetermined density, and to perform correction to increase a density of a pixel adjacent to the target pixel when the first determination unit determines that the target pixel belongs to the line and the second determination unit determines that the predetermined density of the target pixel is the predetermined density or more.

Further features of the present invention will become apparent from the following description of exemplary embodiments with reference to the attached drawings.

BRIEF DESCRIPTION OF THE DRAWINGS

FIG. 5 is a one-to-one correspondence table from an input density to an output density.

FIG. 6 illustrates a relationship between an input density and an output density.

DESCRIPTION OF THE EMBODIMENTS

Figure 1:
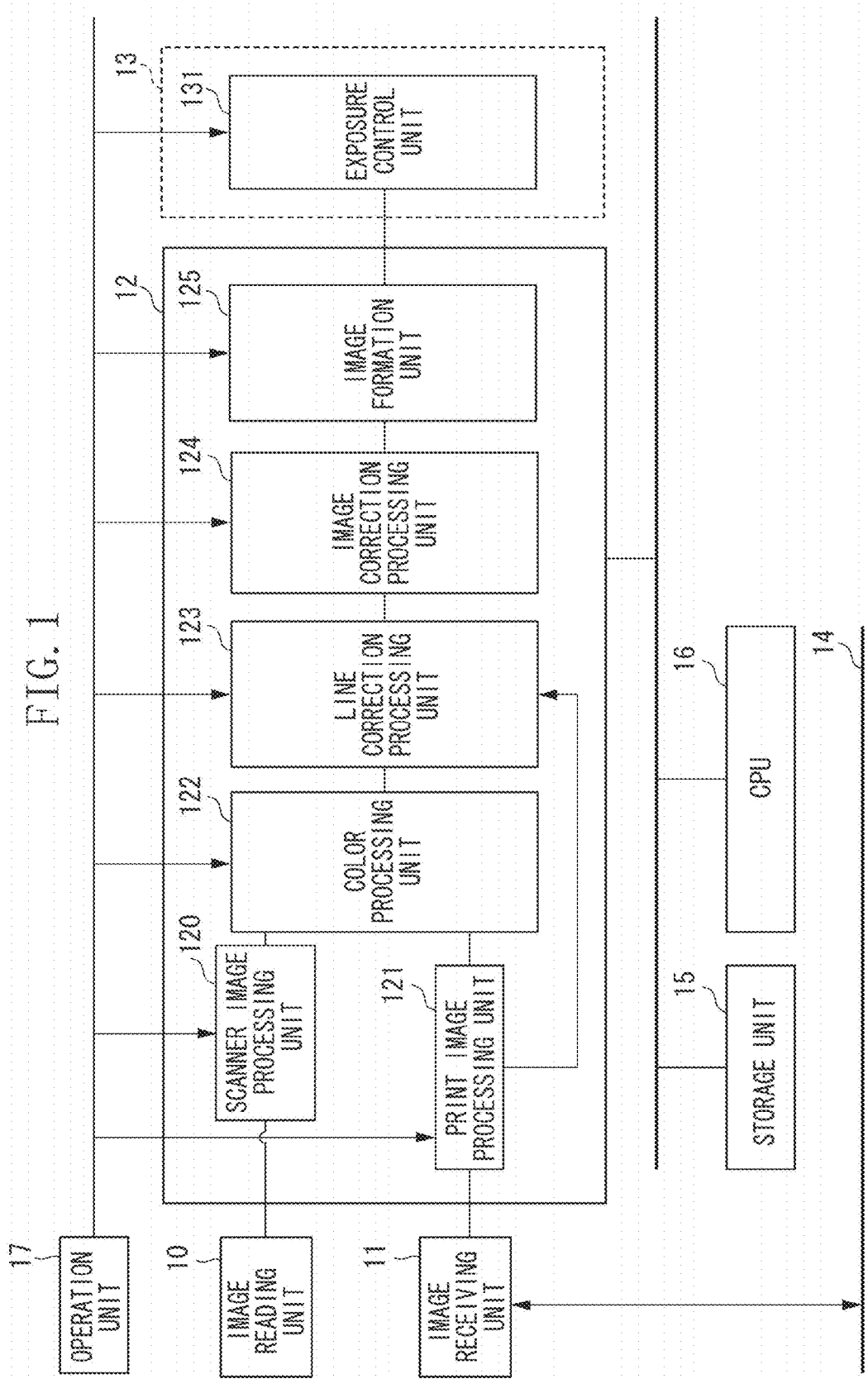
FIG. 1 illustrates a hardware configuration of an image processing apparatus.

According to one aspect of an exemplary embodiment, described below, visibility can be improved for both a low-density line and a high-density line.

Image Processing Apparatus

An image processing apparatus according to a first exemplary embodiment will be described below.

The present exemplary embodiment will be described by taking an image forming apparatus as an example of the image processing apparatus according to the present exemplary embodiment.

Processing performed in the image processing apparatus according to the present exemplary embodiment includes processing (expansion processing) for (1) increasing the density of a low-density line included in image data and (2) increasing the width of a high-density line included in the image data.

To specify the line included in the image data, attribute data is used. There are some methods for generating the attribute data. For example, the attribute data is generated, when image data of a page is generated by rendering based on a Page Description Language (PDL) command, depending on the type of the PDL command. If the PDL command is a command to draw the line, for example, an attribute of pixels constituting an object generated by the PDL command is a line attribute.

The generated attribute data and the generated image data are associated with each other.

Further, for example, the attribute data is generated from a result of analysis of the image data of the page generated by rendering or image data of a page generated by scanning a document. For example, edge detection may be performed for the image data of the page, to generate attribute data treating as a line attribute an attribute of pixels included within detected edges in which a distance between the edges is a predetermined threshold value or less. A method for the analysis is not limited to only the edge detection.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store information. Examples of the processor readable or machine accessible medium that may store include a storage medium, an electronic circuit, a semiconductor memory device, a read only memory (ROM), a flash memory, a Universal Serial Bus (USB) memory stick, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

In the present exemplary embodiment, an object constituted by pixels having a line attribute is handled as a line. However, an object constituted by pixels having a character attribute may also be handled as a line. Further, the attribute may also be subdivided, to handle an object constituted by pixels having a thin line attribute (an attribute corresponding to a line having a predetermined line width or less) and a small-character attribute (an attribute corresponding to a character having a predetermined number of points or less) as a line. The respective pixels having the thin line attribute, the character attribute, and the small-character attribute will be described below as a pixel having a line attribute.

FIG. 1 is a block diagram illustrating a hardware configuration of an image forming apparatus. While the image forming apparatus is a multi function peripheral (MFP), it may be another image forming apparatus such as a single function printer (SFP).

The image forming apparatus includes an image reading unit 10, an image receiving unit 11, an image processing unit 12, an image output unit 13, a storage unit 15, a central processing unit (CPU) 16, and an operation unit 17. The units are connected to one another via a communication line such as a bus. The image forming apparatus can also be connected to a server or a personal computer (PC) that issues an instruction to perform printing to the image forming apparatus, via an external communication path 14 such as a local area network (LAN) or the Internet.

Each of the units in the image forming apparatus will be described below.

The storage unit 15 includes various storage media such as a random access memory (RAM) and a read only memory (ROM). For example, the RAM is used as a region storing data and various types of information or a work area for the CPU 16. On the other hand, the ROM is used as a region storing various types of control programs. The CPU 16 performs processing according to the program stored in the storage unit 15.

Figure 2:
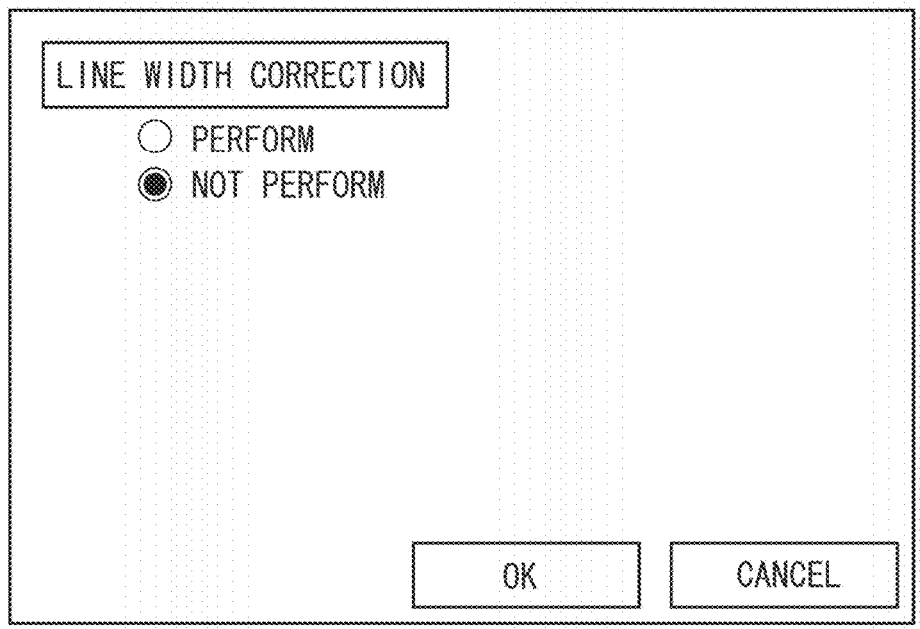
FIG. 2 illustrates a setting screen to select whether or not line correction processing is to be executed.

The operation unit 17 is a user interface as a touch screen, and receives an instruction as to whether each processing in the image processing unit 12 is performed from a user. For example, the operation unit 17 displays a setting screen as illustrated in FIG. 2, and receives from the user an instruction as to whether a line correction processing unit 123 performs line correction processing (described below). The operation unit 17 notifies as a flag 203 the line correction processing unit 123 of the instruction as to whether line correction processing is performed. When "perform" is set to "line width correction" on the setting screen, the line correction processing is performed on a line object, and line correction processing is not performed on a graphics or image object. When "not perform" is set to "line width correction", the line correction processing is not performed on neither the line object nor the graphics or image object.

A setting screen illustrated in FIG. 2 will be described. The setting screen illustrated in FIG. 2 is displayed on the touch screen of the operation unit 17 by the user. Radio buttons respectively representing two options to "perform" and "not perform" the line width correction are displayed on the setting screen. When the user presses a corresponding portion on the touch screen, the radio button is selected. When the user presses an "OK" button with either one of the radio buttons selected, the operation unit 17 receives the instruction as to whether line width correction is performed. If a "cancel" button is pressed, setting immediately before the setting screen is displayed is taken over. While the setting screen is displayed as "line width correction", it may be displayed as "line density correction".

The image reading unit 10 reads an image using a device such as a charge coupled device (CCD) or a contact image censor (CIS), configured in its inner part (not illustrated), and acquires bit map data (image data) in red (R), green (G), and blue (B). The acquired image data is output to a scanner image processing unit 120 in the image processing unit 12. The scanner image processing unit 120 performs image processing such as shading correction, image area separation processing, and color conversion for the output image data, and outputs the processed image data to a color processing unit 122. An attribute of pixels included in the image data may be determined by image separation processing.

On the other hand, PDL data serving as a print job, which has been received from the PC by the image receiving unit 11, is output to the print image processing unit 121. The PDL data is data including a PDL command group representing each of objects included in an image representing a page (a page image).

A print image processing unit 121 interprets the PDL command group, and generates bit map data (image data) of the page. The PDL data may include information indicating whether line correction processing is performed. If the PDL data includes such information, the print image processing unit 121 notifies the line correction processing unit 123 of a flag indicating whether the user has issued an instruction to perform line correction processing as the flag 203 based on the information. This flag is distinguished for each print job.

The print image processing unit 121 generates attribute data 200, as described above, and outputs the generated attribute data to the line correction processing unit 123. The attribute data 200 is data representing an attribute of pixels included in the image data of the page. The attribute includes a line attribute, an image attribute, and a graphics attribute.

The color processing unit 122 receives the image data from the image reading unit 10 or the image data from the image receiving unit 11, and -converts color of the image data into process color (CMYK) image data. The color processing unit 122 outputs the image data after the color conversion (image data 201) to the line correction processing unit 123. The process color image data is multivalued image data of color plates in cyan, magenta, yellow, and block serving as a process color.

The line correction processing unit 123 subjects, among pixels included in the image data 201 output from the color processing unit 122, the pixel having a line attribute to line correction processing, and outputs processed image data 202 to an image correction processing unit 124. Details of the processing by the line correction processing unit 123 will be described below.

An image correction processing unit 124 subjects the image data 202 output from the line correction processing unit 123 to various types of image correction processing, and outputs the processed image data to an image forming unit 125. The image correction processing includes filter processing (including edge enhancement processing and smoothing processing) and gamma processing.

The image forming unit 125 subjects the image data output from the image correction processing unit 124 to N-value processing (e.g., binarization processing) using dither processing, and outputs the processed N-value image data to the image output unit 13. "N" in the N-value processing satisfies a relationship of M>N if the image data output from the image correction processing unit 124 is M.

The image output unit 13 includes an exposure control unit 131 and an electrophotographic printing engine (not illustrated). The exposure control unit 131 converts a density (a pixel value) represented by the N-value image data output from the image forming unit 125 into a pulse-width signal, and outputs the signal obtained by the conversion to the printing engine. A conversion table is used for conversion from the density to the signal. A bit string signal 0x0FF0 in hexadecimal notation is found from the conversion table if the density of image data to be output is 8 (0x1000 in hexadecimal notation), for example. ON/OFF of exposure made with a laser beam in the printing engine is adjusted in response to this signal. This is generally referred to as pulse width modulation control (PWM control). The larger the density of the pixel included in the image data is, the longer an exposure time (ON of exposure) for the pixel becomes, and the shorter a non-exposure time (OFF of exposure) for the pixel becomes. If the density of the pixel is a maximum density (a density of 100%), there is no non-exposure time for the pixel. If the density of the pixel is a minimum density (a density of 0%), there is no exposure time for the pixel. In the printing engine, ON/OFF of exposure made with a laser beam is adjusted based on a pulse signal output from the exposure control unit 131 so that an image is printed on paper (a sheet). If the image data after the dither processing is binary image data, there is no non-exposure time for the pixel if the pixel is ON ("1") and there is no exposure time for the pixel if the pixel is OFF ("0").

As a property of PWM control, when an exposure time for a pixel becomes long, the intensity and the width of exposure for the pixel respectively become high and large. Thus, the longer the exposure time for the pixel, the larger the amount and the area of a coloring agent for the pixel. More specifically, the pixel looks thicker and wider for the user when the exposure time is long than when the exposure time is short.

A hardware configuration of the image forming apparatus serving as an example of the image processing apparatus according to the present exemplary embodiment has been described above. While the image output unit 13 in the image processing apparatus according to the present exemplary embodiment includes the exposure control unit 131 and the electrophotographic printing engine, the present invention is not limited to this embodiment. More specifically, as long as the printing engine is of a type of varying an amount of a coloring agent per pixel to be fixed on a sheet, the invention can be applied. For example, an inkjet printing engine may also be used.

Line Correction Processing Unit

The line correction processing by the line correction processing unit 123 will be described below.

The outline of the line correction processing will be first described. (1) The line correction processing unit 123 determines whether the flag 203 indicates that the user has issued an instruction to perform the line correction processing. (2) The line correction processing unit 123 determines whether an attribute of the pixel included in image data is a line attribute. (3) The line correction processing unit 123 determines the density of the pixel included in the image data. (4) The line correction processing unit 123 outputs the image data 202 obtained by correcting the image data 201 to the image correction processing unit 124 based on results of the determinations (1) to (3).

Figure 3A:
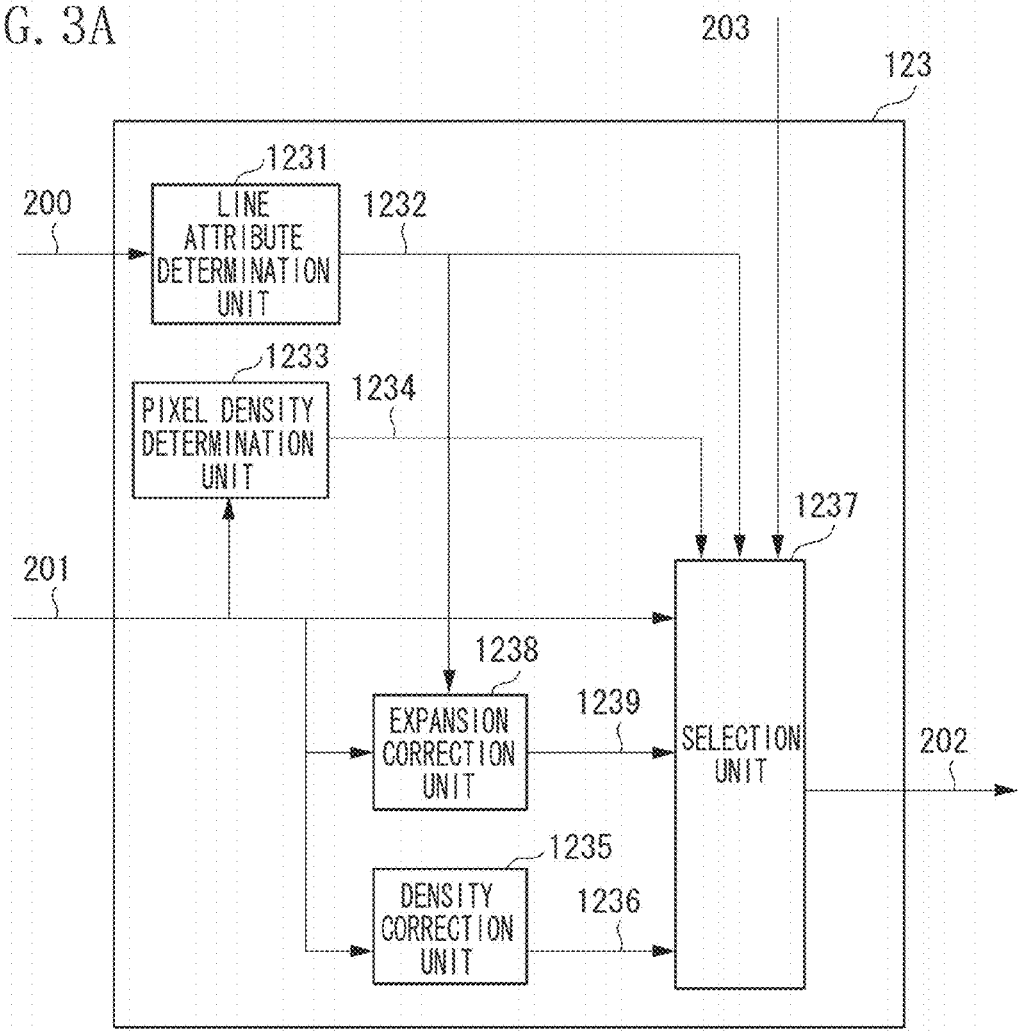
FIGS. 3A and 3B illustrate a line correction processing unit.

FIG. 3A illustrates a hardware configuration of the line correction processing unit 123 in the present exemplary embodiment. Processing performed by the line correction processing unit 123 for a target pixel included in image data will be described below. However, actually, the processing is repeatedly performed by the line correction processing unit 123 so that all pixels corresponding to one page are processed as a target pixel by shifting the target pixels one by one. The processing by the line correction processing unit 123 is performed for image data with respect to color plates in a process color.

Figure 3B:
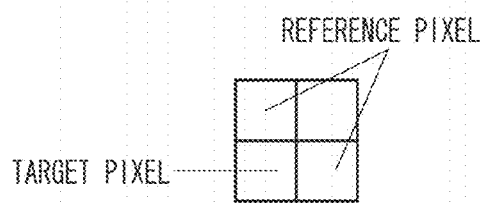

In the present exemplary embodiment, image data 201 of a 2 pixels×2 pixels size including a target pixel at the lower left and corresponding attribute data 200, as illustrated in FIG. 3B, are input from the color processing unit 122 to the line correction processing unit 123. In the image data 201 and the attribute data 200 of the 2 pixels×2 pixels size, the target pixel is arranged at the lower left, and reference pixels are arranged adjacent to the top and the right of the target pixel. The image data of the 2 pixels×2 pixels size is used as an input unit because the density of the target pixel may be determined depending on the density and the attribute of the reference pixels around the target pixel, other than depending on only the density and the attribute of the target pixel.

A line attribute determination unit 1231 refers to the attribute data 200 of the target pixel, and determines the attribute of the target pixel. If the attribute of the target pixel is a line attribute, the line attribute determination unit 1231 outputs information as a flag 1232 indicating that the target pixel has a line attribute, to a selection unit 1237.

If the attribute of the target pixel is not the line attribute, the line attribute determination unit 1231 refers to the attribute data 200 at the reference pixel, and determines the attribute of the reference pixel. If the attribute of the reference pixel is a line attribute, the line attribute determination unit 1231 outputs information indicating that the reference pixel has a line attribute, as the flag 1232 to the selection unit 1237. In this case, the line attribute determination unit 1231 also outputs information indicating whether the reference pixel on the top or on the right of the target pixel has a line attribute, as the flag 1232 to the selection unit 1237. If both reference pixels have a line attribute, information indicating that both reference pixels have a line attribute is output to the selection unit 1237.

If neither the target pixel nor the reference pixel has a line attribute, the line attribute determination unit 1231 outputs information indicating that there is no line attribute, as the flag 1232 to the selection unit 1237.

The line attribute determination unit 1231 also outputs the flag 1232, described above, to an expansion correction unit 1238.

A pixel density determination unit 1233 refers to the image data 201 of the target pixel, and determines whether the density of the target pixel is less than a predetermined density. The pixel density determination unit 1233 refers to the image data 201 of the reference pixel, and determines whether the density of the reference pixel is less than the predetermined density. The predetermined density is 80%. A density is X%, when a minimum density of the pixel is a pixel value "0" and a maximum density of the pixel is a pixel value "255". In other words, X% of the maximum density (255) refers to a pixel value obtained by rounding up (255×X/100) after a decimal point.

(1) If both the density of the target pixel and the densities of each reference pixel are less than the predetermined density, the pixel density determination unit 1233 outputs information indicating that the densities of the target pixel and the reference pixels are less than the predetermined density, as the flag 1234 to a selection unit 1237.

(2) If the density of the target pixel is less than the predetermined density and the density of at least one of the reference pixels is the predetermined density or more, the pixel density determination unit 1233 outputs information indicating that the density of the target pixel is less than the predetermined density and the density of the reference pixel is the predetermined density or more, as the flag 1234 to the selection unit 1237. In this case, the pixel density determination unit 1233 also outputs information indicating whether the reference pixels on the top or on the right of the target pixel has a density equal to or more than the predetermined density, as the flag 1234 to the selection unit 1237. If the densities of both of the reference pixels are the predetermined density or more, the pixel density determination unit 1233 outputs information indicating that the densities of both reference pixels are the predetermined density or more to the selection unit 1237.

(3) If the density of the target pixel is the predetermined density or more, and the density of the reference pixel is less than the predetermined density, the pixel density determination unit 1233 outputs information indicating that the density of the target pixel is the predetermined density or more and the density of the reference pixel is less than the predetermined density, as the flag 1234 to the selection unit 1237.

(4) If the density of the target pixel and the density of the reference pixel are the predetermined density or more, the pixel density determination unit 1233 outputs information indicating that the densities of the target pixel and the reference pixel are the predetermined density or more, as the flag 1234 to the selection unit 1237.

A density correction unit 1235 performs correction to make the density of the image data 201 of the target pixel higher. The density correction unit 1235 outputs image data 1236 of the corrected target pixel, to the selection unit 1237. The density correction will be described below.

In the density correction, the density (output density) of the image data 1236 is obtained based on the density (input density) of the image data 201 of the target pixel. One method for obtaining the output density is obtaining the output density using a look-up table (hereinafter merely referred to as a table).

The density correction unit 1235 in the present exemplary embodiment includes a register (not illustrated) in its inner part, and stores a table illustrated in FIG. 5 within the register. This table is a one-to-one correspondence table from an input density to an output density. The density correction unit 1235 refers to an input density in the table, which corresponds to the density of the image data 201 of the target pixel, to obtain an output density, so as to determine the density of image data 1236. The density of the output image data 1236 is its maximum density or less.

A relationship between an input density and an output density in the table is previously obtained according to a curve 701 illustrated in FIG. 6. The curve 701 is one example.

The curve 701 indicates that an input-output relationship between densities monotonously increases. The curve 701 indicates that a density output when an input density is the above-mentioned predetermined density or more is equal to the input density. On the other hand, the curve 701 indicates that a density output when an input density is less than the predetermined density is higher than the input density. The density correction unit 1235 performs density correction according to the curve 701 having such an input-output relationship. Therefore, if the input density is a density (low density) that is less than the predetermined density, an output having a higher density than the input density is obtained.

When the output density is increased, if the density of the target pixel is less than the predetermined density, an exposure time in the printing engine in the image output unit 13 can be increased. As a result, the target pixel can be printed at an appropriate density even if its original density is low.

As described above, the density correction unit 1235 in the present exemplary embodiment obtains the output density by using the table. However, an output density may also be obtained from an input density not by using the table but based on an arithmetic equation for implementing the input-output relationship between densities illustrated in FIG. 6.

The expansion correction unit 1238 performs line expansion processing for the image data 201 of the target pixel.

Details of the processing will be described. First, the expansion correction unit 1238 receives the image data 201 and the flag 1232.

The expansion correction unit 1238 refers to the flag 1232. If the flag 1232 referred to is information indicating that the reference pixel has a line attribute, the density of the reference pixel having a line attribute is output to the selection unit 1237 as image data 1239 of the corrected target pixel. If both reference pixels on the top and the right of the target pixel have a line attribute, the pixel showing higher densities of the two reference pixels is output as the image data 1239. More specifically, the processing by the expansion correction unit 1238 corresponds to processing for thickening the density of the target pixel adjacent to the reference pixel based on the density of the reference pixel. In other words, this processing corresponds to processing for increasing the width of a line existing in the reference pixel up to the target pixel.

If the flag 1232 referred to is information other than the information indicating that the reference pixel has a line attribute, the density of the image data 201 of the target pixel is output as image data 1239 to the selection unit 1237.

The flags 203, 1232, and 1234 and the image data 201, 1236, and 1239 of the target pixel are input to the selection unit 1237. The selection unit 1237 outputs the image data 202 of the target pixel to the image correction processing unit 124 based on the input. An output operation will be described with reference to an operation flow of FIG. 4.

In step S110, the selection unit 1237 refers to the flag 203. If the flag 203 indicates "a user has issued an instruction to perform line correction processing" (YES in step S110), the processing proceeds to step S111. Otherwise (NO in step S110), the processing proceeds to step S117.

In step S111, the selection unit 1237 refers to the flag 1232. If the flag 1232 indicates that an attribute of a target pixel is a line attribute (YES in step S111), the processing proceeds to step S112. Otherwise (NO in step S111), the processing proceeds to step S114.

In step S112, the selection unit 1237 refers to the flag 1234. If the flag 1234 indicates that the density of the target pixel is less than a predetermined density (YES in step S112), the processing proceeds to step S113. Otherwise (NO in step S112), the processing proceeds to step S117.

In step S114, the selection unit 1237 refers to the flag 1232. If the flag 1232 indicates that an attribute of a reference pixel is a line attribute (YES in step S114), the processing proceeds to step S115. Otherwise (NO in step S114), the processing proceeds to step S117.

In step S115, the selection unit 1237 refers to the flag 1234. The selection unit 1237 determines whether the flag 1234 indicates that the density of the target pixel and the density of the reference pixel satisfy a predetermined condition. If the density of the target pixel is less than the predetermined density and the density of the reference pixel is the predetermined density or more, the predetermined condition is satisfied. If the flag 1234 indicates that the density of the target pixel and the density of the reference pixel satisfy the predetermined condition (YES in step S115), the processing proceeds to step S116. Otherwise (NO in step S115), the processing proceeds to step S117.

In step S113, the selection unit 1237 outputs the image data 1236 (image data of the target pixel, which has been corrected by the density correction unit 1235) as the image data 202 of the target pixel to the image processing unit 124. An operation flow for the target pixel ends. If there is a pixel to be subsequently processed, the pixel is taken as a target pixel, and the processing is repeated.

In step S116, the selection unit 1237 outputs the image data 1239 (image data of the target pixel, which has been corrected by the expansion correction unit 1238) as the image data 202 of the target pixel to the image processing unit 124. An operation flow for the target pixel ends. If there is a pixel to be subsequently processed, the pixel is taken as a target pixel, and the processing is repeated.

In step S117, the selection unit 1237 outputs the image data 201 of the target pixel as the image data 202 of the target pixel to the image processing unit 124. The image data 201 of the target pixel means image data of the target pixel that has not been corrected by the density correction unit 1235 and the expansion correction unit 1238. An operation flow for the target pixel ends. If there is a pixel to be subsequently processed, the pixel is taken as a target pixel, and the processing is repeated.

Figure 4:
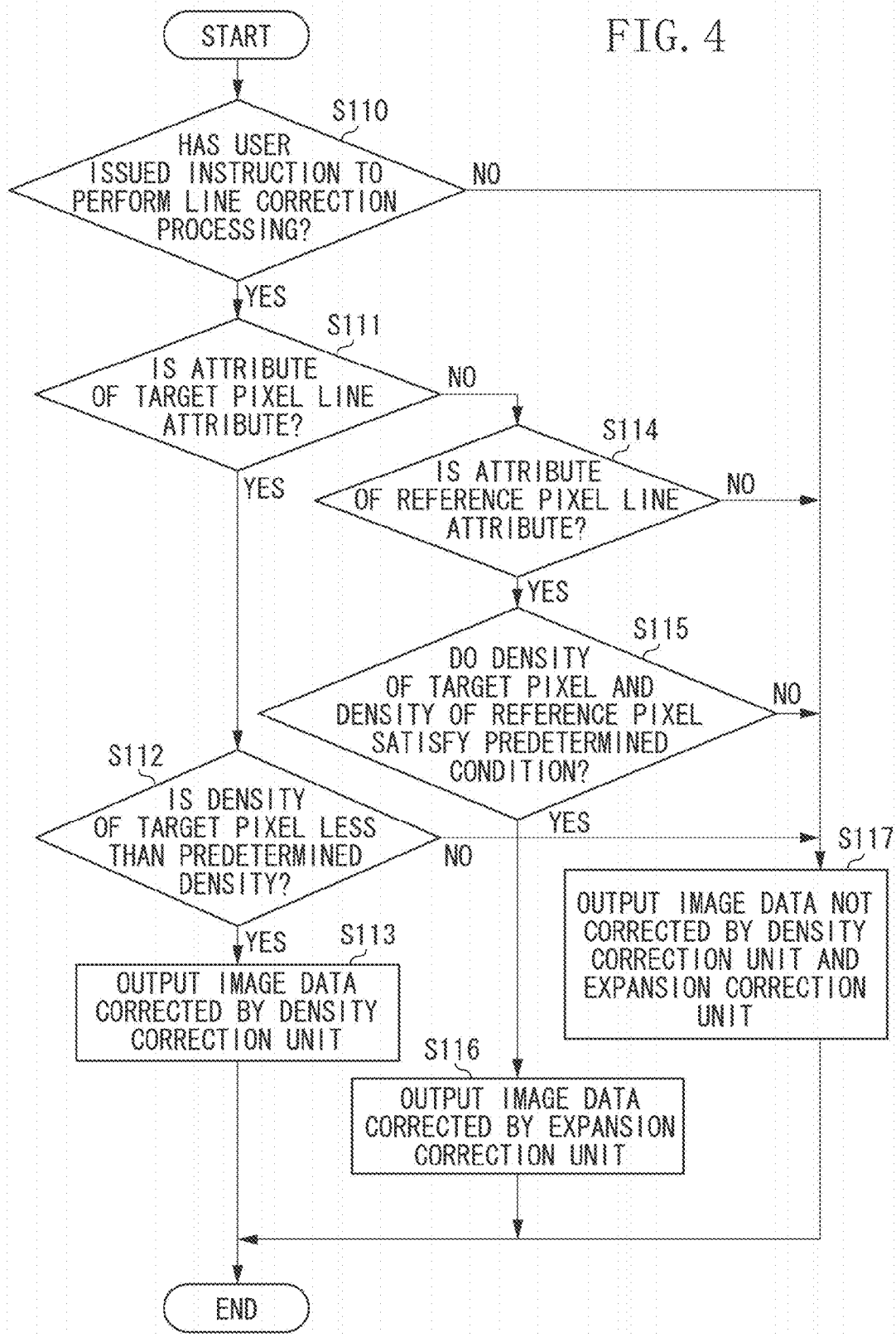
FIG. 4 illustrates an operation flow of a selection unit.

In the above described operation flow illustrated in FIG. 4, the density of the pixel is determined after an attribute of the pixel is determined. However, each determination may be performed in a different order from that described above. For example, the attribute of the pixel may be determined after the density of the pixel is determined. More specifically, as long as (1) if the target pixel has a line attribute and the density of the target pixel is less than the predetermined density, the processing in step S113 is performed, and (2) if the reference pixel has a line attribute and the density of the reference pixel is the predetermined density or more, the processing in step S116 is performed, a determination order and a determination timing are not limited to the exemplary embodiment. In addition, for the determination (2), if the target pixel does not has a line attribute and the reference pixel has a line attribute and the reference pixel has a density equal to or more than the predetermined density, the processing in step S116 is suitably performed.

The important thing is that processing for increasing the density of an object showing a low-density line is performed and processing (expansion processing) for increasing the width of an object showing a high-density line is performed. More appropriately, an object other than the lines is passed without treatment.

While the above described line correction processing by the line correction processing unit 123 is controlled based on a reference result of the flag 203 notified from the operation unit 17, it may be controlled based on a reference result of a flag notified from the print image processing unit 121.

The foregoing is an output operation flow of the image data 202 of the target pixel in the line correction processing unit 123. According to the flow, the density of the low-density line is increased. Thus, an exposure time can be lengthened with PWM control of the image forming unit 125 in the succeeding stage for the low-density line. As a result, the print image quality of the low-density line can be improved. Further, the width of the high-density line is increased. Thus, the area of a region exposed with PWM control of the image forming unit 125 in the succeeding stage is increased for the high-density line. As a result, the print image quality of the high-density line can be improved.

Effect of Processing by Line Correction Processing Unit

An effect of processing by the line correction processing unit 123 for a low-density thin line will be described with reference to FIGS. 7A to 7D. The image forming unit 125 performs dither processing of 212 lines and 45 degrees, for example. In FIGS. 7A to 7D, pixels indicated in black correspond to areas to be exposed.

Figure 7A:
FIGS. 7A to 7D illustrate correction for a low-density line.

FIG. 7A illustrates multivalued image data 201 representing a thin line object with a one-pixel width having a density (a density of 30%: a low density) less than a predetermined density.

Figure 7B:
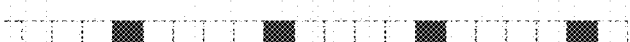

FIG. 7B illustrates image data after the dither processing as a result of processing of the multivalued image data 201 illustrated in FIG. 7A by the image correction processing unit 124 and the image forming unit 125.

Figure 7C:

FIG. 7C illustrates multivalued image data 202 obtained as a result of processing of the multivalued image data illustrated in FIG. 7A by the line correction processing unit 123. The image data 202 is multivalued image data representing a thin line object with a one-pixel width having a density of 60% obtained by increasing the density of the low-density thin line object by the line correction processing unit 123.

Figure 7D:
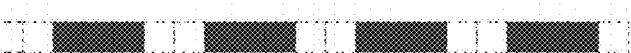

FIG. 7D illustrates image data obtained after the dither processing as a result of processing of the multivalued image data illustrated in FIG. 7C by the image correction processing unit 124 and the image forming unit 125. Thus, the image data representing the thin line object having a density increased by the line correction processing unit 123 becomes a target of the dither processing by the image forming unit 125. As a result, pixels exposed by the image output unit 13 based on the image data illustrated in FIG. 7D are positionally continuous compared with those based on the image data illustrated in FIG. 7B, so that the number of breaks in a line is reduced. More specifically, the line correction processing unit 123 increases the density of the low-density thin line object, to improve visibility of the line (e.g., thin line).

An effect of processing by the line correction processing unit 123 for a high-density thin line will be described with reference to FIGS. 8A to 8F. The image forming unit 125 performs dither processing of 212 lines and 45 degrees, for example. In FIGS. 8A to 8F, pixels indicated in black correspond to sites to be exposed.

Figure 8A:
FIGS. 8A to 8F illustrate correction for a high-density line.

FIG. 8A illustrates multivalued image data 201 representing a thin line object with a one-pixel width having a density (a density 80%: a high density) equal to or more than a predetermined density.

Figure 8B:

FIG. 8B illustrates image data after the dither processing obtained as a result of processing of the multivalued image data 201 illustrated in FIG. 8A by the image correction processing unit 124 and the image forming unit 125.

Figure 8C:

FIG. 8C illustrates multivalued image data 202 obtained as a result of processing of the multivalued image data illustrated in FIG. 8A by the line correction processing unit 123. The image data 202 is multivalued image data representing a thin line object with a two-pixel width having a density of 80% obtained by increasing the line width (area) of the high-density thin line object by the line correction processing unit 123.

Figure 8D:

FIG. 8D illustrates image data after the dither processing obtained as a result of processing of the multivalued image data illustrated in FIG. 8C by the image correction processing unit 124 and the image forming unit 125. Thus, image data representing the thin line object having a width increased by the line correction processing unit 123 becomes a target of the dither processing by the image forming unit 125. As a result, the number of pixels exposed by the image output unit 13 based on the image data illustrated in FIG. 8D is more than that based on the image data illustrated in FIG. 8B, so that the density of a line as locally viewed is sufficiently increased. More specifically, the line correction processing unit 123 increases the line width of the high-density thin line object, to improve visibility of the line (e.g., thin line).

Figure 8E:

On the other hand, FIG. 8E illustrates multivalued image data obtained by increasing the density of the multivalued image data 201 illustrated in FIG. 8A to a maximum density (a density of 100%).

Figure 8F:

FIG. 8F illustrates image data after the dither processing obtained as a result of processing of the multivalued image data having the maximum density illustrated in FIG. 8E by the image correction processing unit 124 and the image forming unit 125. The number of pixels exposed by the image output unit 13 based on the image data illustrated in FIG. 8F is significantly smaller than that illustrated in FIG. 8D, although slightly larger than that illustrated in FIG. 8B. More specifically, a line printed by the image data illustrated in FIG. 8F is not very different from a line printed by the image data illustrated in FIG. 8B. Thus, visibility of the line is hardly improved. However, a line (e.g., a thin line) printed by the image data illustrated in FIG. 8D becomes thick and wide. Thus, visibility of the line is significantly improved.

Another effect by the line correction processing unit 123 in the present exemplary embodiment will be described with reference to FIG. 9.

Figure 9A:
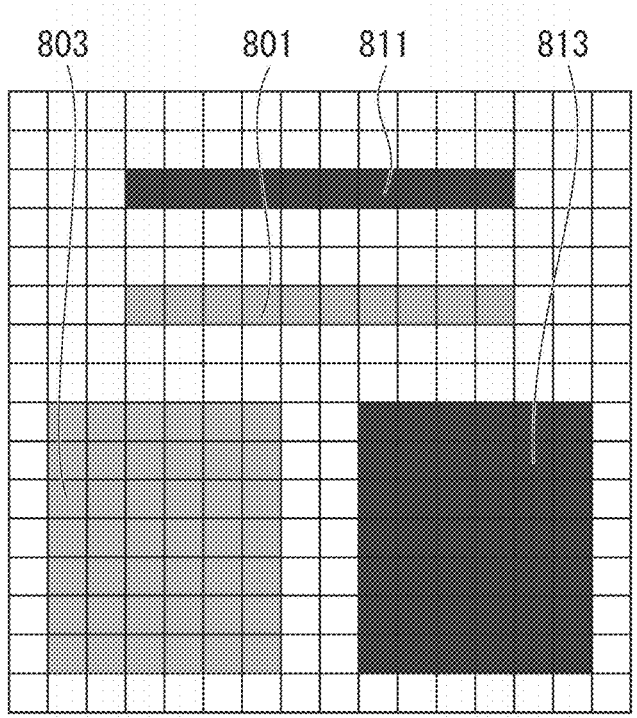
FIGS. 9A to 9B illustrate correction for image data including a plurality of types of objects.

FIG. 9A illustrates image data 201 including a low-density line object 801 having a line attribute, a high-density line object 811 having a line attribute, a low-density graphics object 803 having a graphics attribute, and a high-density graphics object 813 having a graphics attribute. It is generally important for the user that the line object is clear and the graphics object is rich in gradation.

Figure 9B:
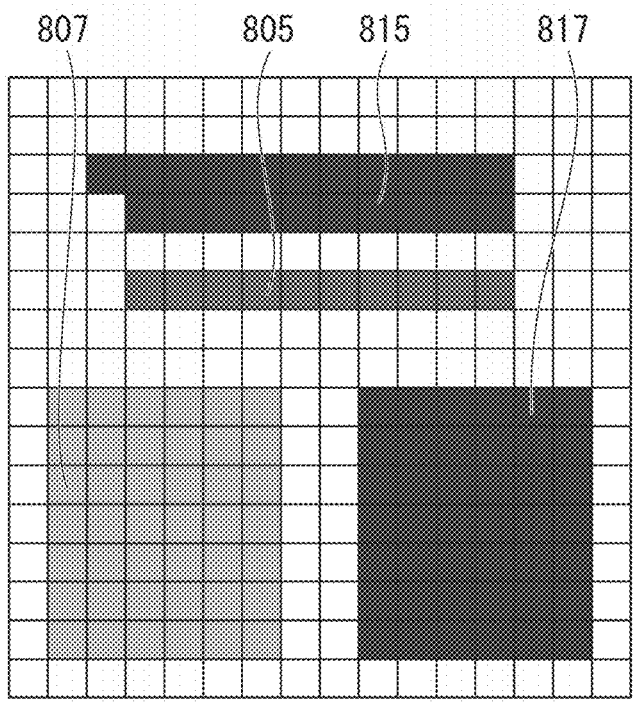

FIG. 9B illustrates image data 202 obtained by performing processing by the line correction processing unit 123 for image data 201 illustrated in FIG. 9. The image data 202 includes line objects 805 and 815 and graphics objects 807 and 817. The line object 805 is the line object 801 whose density is increased. The line object 815 is the line object 811 whose line width is increased. On the other hand, the graphics objects 807 and 817 are equivalent to the graphics objects 803 and 813.

Thus, a line object for which visibility is important is selectively corrected, and a graphics object for which gradation is important is not corrected. Thus, gradation of graphics can be maintained while the sharpness of a line is improved.

When the low-density line object 801 and the high-density line object 811 are printed on paper, a person feels that there are differences in width and density between lines. If correction is performed to increase the densities of pixels included in each of the line object 801 and the line object 811, the density of each of the pixels included in the line object 811 only increases to a maximum density. Thus, the original density difference between the line object 801 and the line object 811 decreases, so that the difference between the two lines becomes difficult to distinguish in the person's eyes. On the other hand, in the present exemplary embodiment, as illustrated in the line objects 805 and 815 in FIG. 9B, the density is increased for the low-density line object 801 while not the density but the width is increased for the high-density line object 811. Thus, the lines can be printed on paper in consideration of a difference in vision due to the original density difference.

As described above, the image processing apparatus according to the present exemplary embodiment includes an image correction processing unit 124, an image forming unit 125, and an exposure control unit 131. However, the present invention is not limited to only the image forming apparatus. Another exemplary embodiment of the present invention includes a case where a program for causing a CPU to function as the above described line correction processing unit 123 is executed by the CPU on the image processing apparatus (a host PC or a server). In this case, the image processing apparatus may perform correction processing for lines and transmit processed image data to an image forming apparatus serving as another external apparatus, as described above. The image forming apparatus may perform processing corresponding to the image correction processing unit 124, the image forming unit 125, and the exposure control unit 131 and perform printing based on the image data.

A second exemplary embodiment will be described below. While the density of the image data is corrected to increase the density and the width of the line according to the first exemplary embodiment, the density of the image data need not be corrected in a line correction processing unit 123 but an exposure amount may be corrected under PWM control by an exposure control unit 131 in the succeeding stage.

In this case, the line correction processing unit 123 inputs a result of determination by a line attribute determination unit 1231 and a pixel density determination unit 1233 to the exposure control unit 131. The exposure control unit 131 switches over to a density-signal conversion table applicable to a pixel to be processed based on the input determination result. A general (first) conversion table to output a bit string signal 0x0FF0 in hexadecimal notation is applied to pixels with a density 8 (low density) having a graphics attribute, for example. However, a (second) conversion table for a low-density line to output a bit string signal 0x3FFC in hexadecimal notation is applied to pixels with a density 8 (low density) having a line attribute. Thus, density correction corresponding to a density correction unit 1235 is performed. More specifically, when the (second) conversion table for the low-density line is applied, the exposure area of an exposed part can be made larger and the spot diameter for exposure can be made larger than those when the general (first) conversion table is applied. As a result, the printed low-density line becomes thicker and wider.

Further, in order to cause the exposure control unit 131 to perform expansion processing for increasing a line width corresponding to the expansion correction unit 1238, the exposure control unit 131 includes a buffer that retains the density of a pixel adjacent to the pixel to be processed. The exposure control unit 131 converts the density of the adjacent pixel based on the input determination result using the general (first) conversion table, to output a bit string signal.

Thus, the exposure control unit 131 can also correct the low-density line and the high-density line. Correction is not performed on graphics and an image object, similar to the first exemplary embodiment. That is, the general conversion table is used in density-signal conversion.

ANOTHER EXEMPLARY EMBODIMENT

In the above described embodiments, the control by the line correction processing unit 123 need not be single control but can also be changed according to setting by the operation unit 17. More specifically, if the operation unit 17 designates an operation mode for improving the image quality of lines, a function configured in the line correction processing unit 123 may be implemented. Alternatively, the line correction processing unit 123 may be configured to gradually change various determination threshold values used for expansion processing control and/or density correction processing control by the line correction processing unit 123 and configured to perform processing to follow an instruction from the operation unit 17 correspondingly.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-125734, filed Jun. 18, 2014, which is hereby incorporated by reference herein in its entirety.

What is claimed is:

1. An image processing apparatus comprising:
    an obtaining unit configured to obtain image data;
    a first determination unit configured to determine whether a pixel included in the image data belongs to a line;
    a second determination unit configured to determine whether a density of the pixel included in the image data is less than a predetermined density; and
    a correction unit configured to perform correction to increase the density of the pixel on a basis of results of the first determination and the second determination, and to perform correction to increase a density of a pixel adjacent to the pixel on the basis of the results of the first determination and the second determination.

2. The image processing apparatus according to claim 1, wherein the correction unit is configured to perform correction to increase the density of the pixel if the pixel belongs to the line and the density of the pixel is less than the predetermined density, and to perform correction to increase a density of a pixel adjacent to the pixel if the pixel belongs to the line and the density of the pixel is the predetermined density or more.

3. The image processing apparatus according to claim 2, wherein the correction unit makes the density of the pixel higher as determined based on the density of the pixel in the correction performed if the pixel belongs to the line and density of the pixel is less than the predetermined density.

4. The image processing apparatus according to claim 3, wherein the predetermined density is determined using a look-up table.

5. The image processing apparatus according to claim 1, wherein the correction unit sets the density of the pixel to a pixel adjacent to the pixel in the correction performed if the pixel belongs to the line and the density of the pixel is the predetermined density or more.

6. The image processing apparatus according to claim 1, wherein the correction unit performs correction to increase the density of the adjacent pixel if the pixel belongs to the line and the density of the pixel is the predetermined density or more and the adjacent pixel does not have a line attribute and the density of the adjacent pixel is less than the predetermined density.

7. The image processing apparatus according to claim 1, wherein
the correction unit inputs the corrected image data to a processing unit, and
the processing unit performs dither processing for the input image data.

8. An image processing method comprising:
obtaining image data;
performing first determination for determining whether a pixel included in the image data belongs to a line;
performing second determination for determining whether a density of the pixel included in the image data is less than a predetermined density;
performing correction to increase the density of the pixel on a basis of results of the first determination and the second determination and;
performing correction to increase a density of a pixel adjacent to the pixel on the basis of the results of the first determination and the second determination.

9. The image processing method according to claim 8, wherein the correction of the density of the pixel is performed if it is determined in the first determination that the pixel belongs to the line and it is determined in the second determination that the density of the pixel is less than the predetermined density, and
wherein the correction of the density of the adjacent pixel is performed if it is determined in the first determination that the pixel belongs to the line and it is determined in the second determination that the density of the pixel is the predetermined density or more.

10. The image processing method according to claim 8, wherein the correction includes making the density of the pixel higher as determined based on the density of the pixel in the correction performed if the pixel belongs to the line and the density of the pixel is less than the predetermined density.

11. The image processing method according to claim 10, wherein the predetermined density is determined using a look-up table.

12. The image processing method according to claim 8, wherein the correction includes setting the density of the pixel to the pixel adjacent to the pixel in the correction performed if the pixel belongs to the line and the density of the pixel is the predetermined density or more.

13. The image processing method according to claim 8, wherein the correction includes performing correction to increase the density of the adjacent pixel if the pixel belongs to the line and the density of the pixel is the predetermined density or more and the adjacent pixel does not have a line attribute and the density of the adjacent pixel is less than the predetermined density.

14. The image processing method according to claim 8, wherein
the correction includes inputting the corrected image data to a processing unit, and
the processing includes performing dither processing on the input image data.

15. An image processing apparatus which corrects a line image, comprising:
a determination unit that determines a density value of a line image; and
a correction unit that corrects the line image whose density value is determined to be less than a threshold value by increasing the density value of the line image, and corrects the line image whose density value is determined to be equal to the threshold value by increasing a density value of a portion adjacent to the line image,
wherein a printing is performed based on the line image which has been corrected.

16. The image processing apparatus according to claim 15, further comprising:
a dither process unit that performs a dither process on the line image which has been corrected,
wherein the printing is performed based on the line image on which the dither process has been performed.

17. The image processing apparatus according to claim 15, wherein the correction unit corrects the line image whose density value is equal to the threshold value by performing the increase of the density value of the portion adjacent to the line image without increasing the density value of the line image.

18. The image processing apparatus according to claim 15, wherein the line image is in a form of a bitmap.

* * * * *